UNITED STATES PATENT OFFICE.

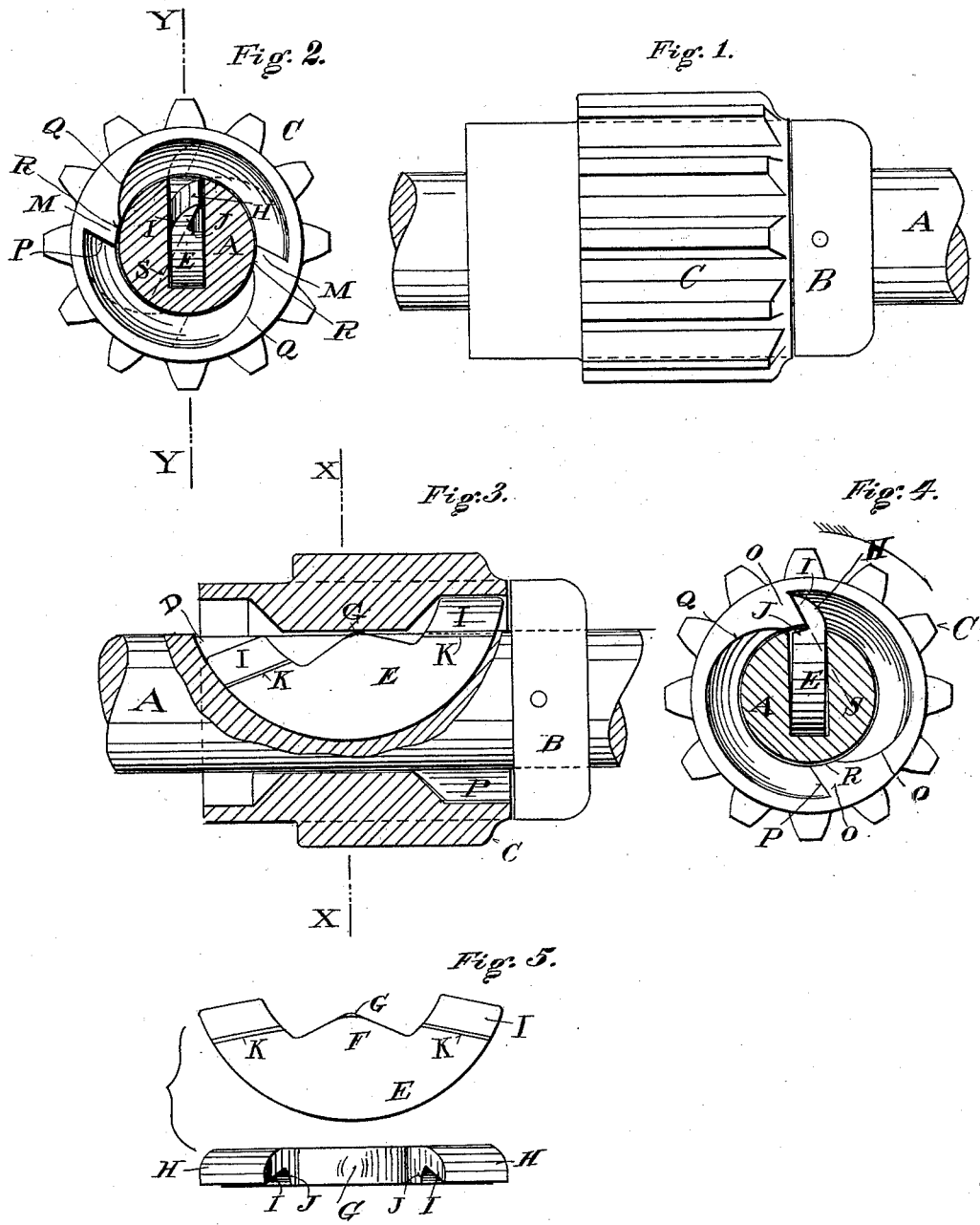

WILLIAM BAYLEY, OF SPRINGFIELD, OHIO, ASSIGNOR OF ONE-HALF TO THOMAS B. EDELIN, OF BROOKLYN, NEW YORK.

PAWL-AND-RATCHET MECHANISM.

SPECIFICATION forming part of Letters Patent No. 422,696, dated March 4, 1890.

Application filed November 23, 1889. Serial No. 331,394. (No model.)

*To all whom it may concern:*

Be it known that I, WILLIAM BAYLEY, a citizen of the United States, residing at Springfield, in the county of Clark and State of Ohio, have invented certain new and useful Improvements in Pawl-and-Ratchet Mechanisms, of which the following is a specification, reference being had therein to the accompanying drawings.

This invention relates to certain new and useful improvements in pawl-and-ratchet mechanism adapted to positively engage a driving pinion or sleeve in one direction with the shaft upon which it is mounted and to allow it to rotate independently of the shaft in a reverse direction, and the device is specially adapted to operate in conjunction with lawn-mowers, though useful for other purposes. It is an improvement over the clutch device set forth in Letters Patent No. 392,282, granted to Aaron J. Moyer November 6, 1888, for lawn-mowers.

My improvements have reference to a construction of the dog and the teeth which engage it, whereby the impingement of the latter upon the former will tend to maintain their contact as distinguished from tending to force them apart; have reference to the arrangement of the dog with respect to the sleeve or pinion, so that the dog will be kept down in its seat during its oscillations by an approximately central point in the length of the dog and at the bore of the pinion or sleeve; have reference to constructing the teeth of the pinion or sleeve with a broadened surface between the faces of the teeth and the inclines which constitute the cam portions, so that such surfaces will form segments that fit upon the shaft and increase the bearing of the sleeve or pinion on the shaft, and at the same time afford an increased bulk of the teeth to withstand greater usage.

In the accompanying drawings, forming a part of this specification, and in which like reference-letters indicate corresponding parts, Figure 1 represents a side elevation of a portion of a shaft with a pinion mounted thereon; Fig. 2, a transverse section of the shaft on the line X X of Fig. 3, with the pinion and dog in end elevation, looking from the outer end; Fig. 3, a longitudinal and sectional view of the pinion and shaft with the dog in side elevation; Fig. 4, a similar view of Fig. 2, taken on the line X X of Fig. 3, but looking toward the inner end of the pinion; and Fig. 5, a detail side view of the dog and a top view thereof.

The letter A designates a shaft—say the reel-shaft of a lawn-mower—preferably having a collar B to form a shoulder, against which one end of the pinion works.

The letter C designates a pinion—say the reel-shaft-driving pinion of a lawn-mower—and which receives rotary motion from the internal gear-teeth on the ground-wheel of that class of machines when the parts are fully organized.

It will be observed that the pinion C might be substituted by a sleeve or pulley or other device to which motion may be applied, or from which motion may be taken in the event that the shaft becomes the driving instead of the driven device. These remarks have reference to using the invention in other machines and places than lawn-mowers, though it is specially designed, as above stated, for this class of machines.

The shaft A has a deep slot D formed therein, with its bottom rounding, being in the arc of a circle. Within this slot is fitted to move freely endwise, as distinguished from sidewise, a dog E, one edge of which is in the arc of a circle substantially corresponding with the bottom of the groove. The middle portion of the dog is formed with a raised portion or projection F, terminating in a rounded apex G, which touches the interior or the bore of the pinion, whereon it acts to hold down the dog as it is moved from one position to the other to be engaged by or engaged with one or the other end of the pinion, sleeve, or pulley. The extremes of the dog are fashioned with rounded sides H and opposite inclined faces I. The inclined faces are formed by recessing the side of the dog at J, which recess begins on the line K and extends in to the base of the incline I. The line K is by preference a radial line struck from the apex G of the dog, so as to be parallel with the shaft at the elevated end of the dog, as seen in Fig. 3. The extreme ends of the dog are preferably parallel with the line K.

Referring now to the pinion, pulley, or sleeve, as the case may be, the letter M designates the teeth in one end and the letter O those in the other end, of which there are preferably two in each set. These teeth, it will be observed, are formed in recesses within the ends of the pinion, and each has an inclined face P and a curved cam-surface Q, the latter terminating some distance from the point of the teeth, so as to leave a considerable bulk of metal and a surface R between such termination and the point of the teeth. These surfaces, of which there is one for each tooth, afford an elongation of the bearing of the pinion upon the shaft and tend to prevent it from playing or becoming unduly loose thereon.

Referring to the inclined faces P, it is to be observed that they agree in direction to the inclined faces I of the dog and that the tendency of the inclines is to cause the dog to move upward at the engaged end and increase and maintain the lap of the dog over and against the tooth. In other words, the harder the pinion-tooth is forced against the dog the greater will be the tendency to maintain the engagement, as the inclines tend to make the dog ride out on the tooth. It is preferred that the line of this incline shall extend forward of the center of rotation, as suggested by the dotted lines S.

In the Moyer patent, to which reference has already been made, the reverse was true—that is, the end of the tooth and the part of the dog with which it engaged represented a line which, if extended toward the center, would go to the rear of it, and thus the tendency was for the tooth to force the dog into the slot and lose its engagement with it, rather than to draw it out of the slot and maintain its engagement therewith, which latter is true in my construction. By this improvement the life of the dog and of the teeth is greatly lengthened and the effectiveness and reliability of the device to always operate are fully assured. The inclined surfaces Q are of obvious functions—namely, to move one end of the dog inward and the other end outward, so as to engage one or the other end of the dog with the pinion, sleeve, or pulley, according to the direction of rotation of the pinion, &c. In the present case the teeth in one end of the pinion are diametrically arranged between those in the other end. The bulk of the metal between the points of the teeth and the termination of the cam-surfaces affords additional wearing-surface as the as the faces P wear away.

Having thus fully described my invention, what I claim as new, and desire to secure by Letters Patent, is—

1. The combination, with a shaft having a slot and a pinion having interior ratchet-teeth with their faces inclined forward, of a dog fitted to operate in said slot and having its ends inclined to substantially correspond with the faces of the teeth, the said inclinations being in a line which, if projected, will extend to one side of the center of rotation.

2. The combination, with a shaft having a slot with a rounded bottom and a pinion mounted thereon and having interior ratchet-teeth with cam-surfaces and inclined faces, of a dog fitted to operate in said slot and having its ends formed on one side with curved surfaces and on the other with the inclined faces substantially agreeing with the surfaces of the teeth, the said inclines being on a line which, if projected, would pass to one side of the center of rotation.

3. The combination, with a shaft having a slot with a rounded bottom, and a pinion mounted on said shaft and having ratchet-teeth, of a dog in said slot and having an approximately central point or apex which engages with the wall of the bore of the pinion to hold the dog down in the slot.

4. The combination, with a shaft having a slot with a curved bottom and a pinion having interior ratchet-teeth provided with cam-surfaces and inclined faces, and a space between the ends of the teeth and the said cam-surfaces, of a dog in said slot with a curved outer edge and a central point or apex engaging with the wall of the bore of the pinion, the dog having its outer ends curved on one side and inclined on the other.

5. A slotted shaft, a dog fitted to work in the slot, and a pinion or sleeve mounted on the shaft, having internal ratchet-teeth whose driving-faces are inclined on a line which, if extended, would pass forward of the center of rotation, and having cams on the backs of said teeth which vibrate the said dog to alternately raise one end and then the other out of the slot when backing.

In testimony whereof I affix my signature in presence of two witnesses.

WILLIAM BAYLEY.

Witnesses:
 OLIVER H. MILLER,
 WARREN HULL.

It is hereby certified that Letters Patent No. 422,696, granted March 4, 1890, upon the application of William Bayley, of Springfield, Ohio, for an improvement in "Pawl-and-Ratchet Mechanism," were erroneously issued to said Bayley and Thomas B. Edelin, of Brooklyn, as owners of the entire interest in said invention; that said Letters Patent should have been issued to *The Rogers Fence Company, of Springfield, Ohio*, said Rogers Fence Company being the assignee of the entire interest as shown by the record of assignments in this office; and that said Letters Patent should be read with this correction therein that the same may conform to the record of the case in the Patent Office.

Signed, countersigned, and sealed this 18th day of March, A. D. 1890.

[SEAL.]

CYRUS BUSSEY,
*Assistant Secretary of the Interior.*

Countersigned:
    C. E. MITCHELL,
        *Commissioner of Patents.*